United States Patent [19]
Pearson

[11] 4,093,290
[45] June 6, 1978

[54] VEHICLE WITH SAFETY DEVICE

[75] Inventor: Leonard Charles Pearson, Wokingham, England

[73] Assignee: National Research Development Corporation, London, England

[21] Appl. No.: 665,229

[22] Filed: Mar. 9, 1976

[30] Foreign Application Priority Data

Mar. 14, 1975 United Kingdom ............... 10752/75

[51] Int. Cl.² ............................................. B60R 21/14
[52] U.S. Cl. ........................................ 293/15; 293/38
[58] Field of Search ................................... 293/24–26, 293/15, 38, 32, 33, 44, 45, 9, 10; 180/82 R, 91

[56] References Cited

U.S. PATENT DOCUMENTS

| 1,126,897 | 2/1915 | Soldati et al. | 293/25 |
| 1,865,014 | 6/1932 | Karl | 293/24 |
| 3,829,140 | 8/1974 | Jehu et al. | 293/38 |

FOREIGN PATENT DOCUMENTS 2,314,551 10/1974 Germany ..................... 293/9

Primary Examiner—Robert B. Reeves
Assistant Examiner—H. Grant Skaggs
Attorney, Agent, or Firm—Oblon, Fisher, Spivak, McClelland & Maier

[57] ABSTRACT

A safety vehicle incorporating an impact member, a collision sensor and a safety device. When the vehicle collides with a typical pedestrian, he is struck by the impact member, which is so placed that it tends to make him fall onto a surface of the vehicle, e.g. the bonnet. The safety device, responding to the sensor, then moves from a stowed position to an operating position in which it restrains him from falling off the surface again. The stowed location of the device and its path of movement to its operating position are chosen so that it does not impede, but may actually assist, the movement of the pedestrian onto the bonnet.

7 Claims, 4 Drawing Figures

VEHICLE WITH SAFETY DEVICE

BACKGROUND OF THE INVENTION

This invention relates to vehicles with safety devices to protect pedestrians who collide with the vehicle.

Collision often tends to knock the pedestrian off his feet so that he lands on the bonnet of the vehicle, and some known safety devices comprise a member which is normally stowed and relatively unobtrusive. When a collision is sensed, this member rises to an operating position in which it forms a barrier around the bonnet, to prevent the victim who has landed there from falling off again.

In principle, such devices have many advantages. Many statistics now suggest that the pedestrian victims of vehicle collision suffer injuries as serious from falling off the vehicle onto the road as from initially hitting and landing upon the vehicle. However, tests with the known safety devices have shown that it is difficult to reconcile reliable operation of the device and acceptable styling of a vehicle such as a motor-car. In particular, although the known designs of vehicles and safety devices have worked well with fully-grown pedestrians, it has proved more difficult to ensure that children and other small, but typical, pedestrians strike the vehicle in a way that causes them to fall upon the bonnet, and to design the device and time its rise so that it does not adversely affect the desired trajectory of the victim onto the bonnet after collision.

BRIEF DESCRIPTION OF THE DRAWINGS

The invention is defined by the claims at the end of this specification and will now be described, by way of example, with reference to the accompanying drawings in which:

DETAILED DESCRIPTION OF THE PREFERRED EMBODIMENTS

Figure 1:
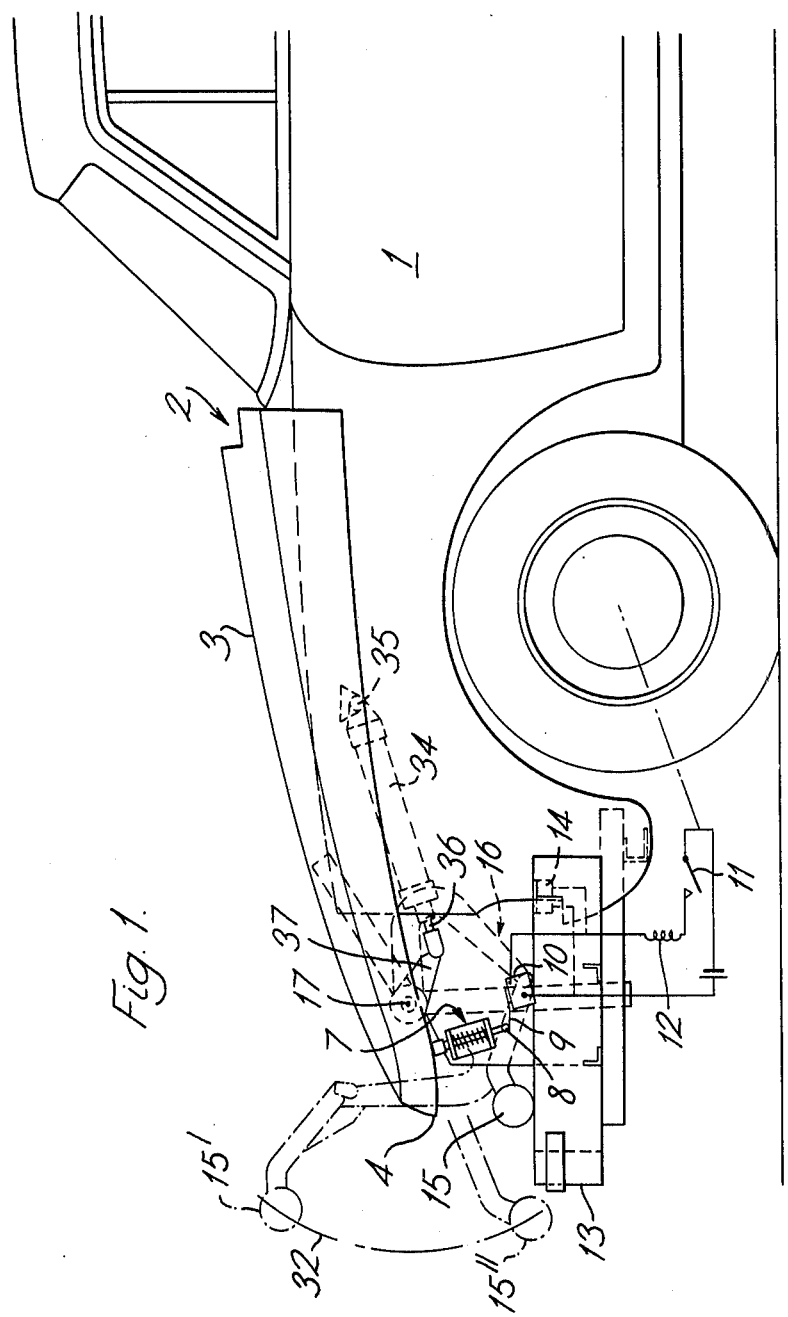
FIG. 1 is a diagrammatic side elevation, partly cutaway, of a vehicle.

FIG. 1 shows a vehicle 1 having a bonnet 2 with upward-facing surface 3 sloping downwards from the rear to its forward edge 4. Bonnet 2 is mounted with a conventional type of pivot at the rear end. Close to the front edge 4 the bonnet, when closed, rests on spring-cushioned plungers 7. When the closed bonnet is abnormally depressed, for instance by a pedestrian landing upon it after a collision, the tip 8 of the rod of each plunger 7 bears against the leaf 9 of a micro-switch 10, which forms part of a conventional electrical circuit 11 including a solenoid 12. The electrical circuit may be energized by a rotation-sensitive switch 11a located on the final drive of the vehicle and set to make circuit 11 live at a previously determined low speed. An impact member in the form of bumper 13 is associated with a similar micro-switch 14 which may, either in addition to or in place of switch 10, form part of the same electrical circuit. Collision of the vehicle with a pedestrian may be sensed and solenoid 12 energized either by the throwing of micro-switch 14 in response to impact with bumper 13, or by the operation of micro-switch 10 in response to the later impact of the pedestrian with upper surface 3 of bonnet 2, or if switches 10 and 14 are both present, then by the earlier of the two operations.

Figure 4:
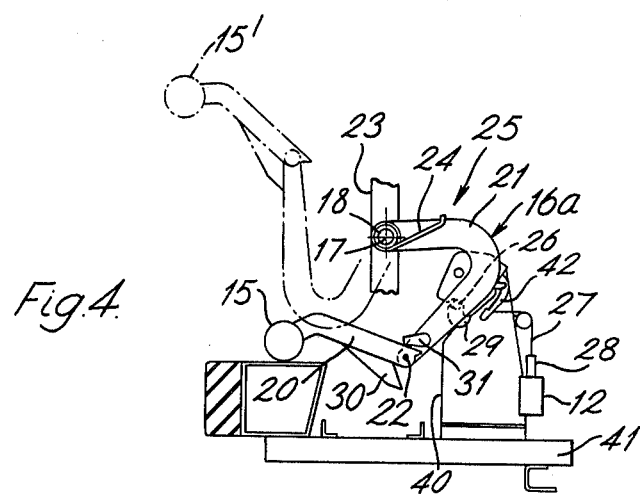
FIG. 4 shows a detail of the safety device, its motor and sensor.
Figure 3:
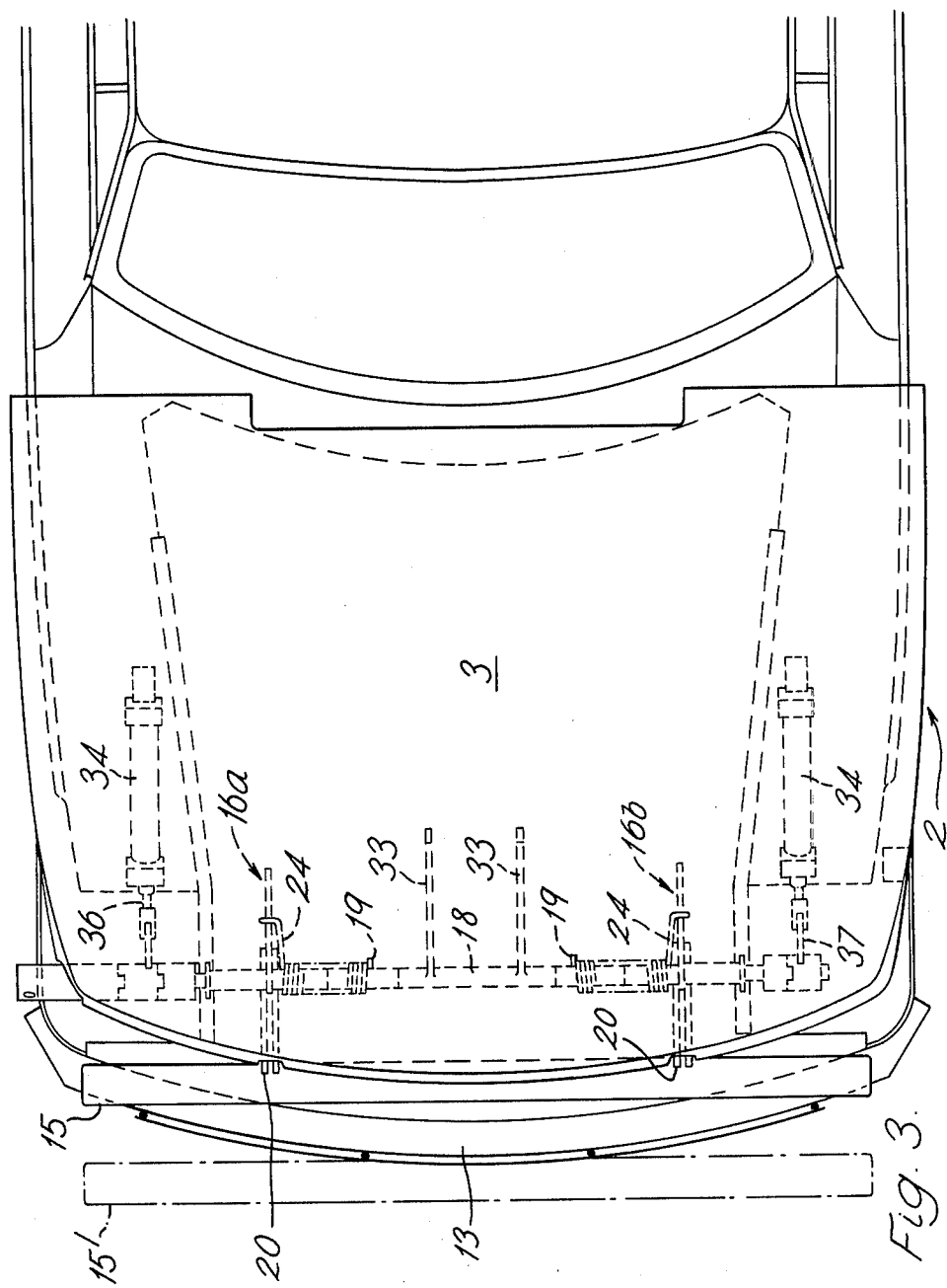
FIG. 3 is a plan view.

The safety device comprises a central base length in the form of a transverse bar 15, of padded or other resilient surface, supported by articulated legs 16 from a transverse pivot axis 17. FIGS. 1 and 4 show the device in its stowed position in full lines, and in its operating position in dashed lines. In the stowed position, it will be seen that the bar rests on the top surface of bumper 13 and thus lies at substantially the same vertical level as the bumper, which constitutes the impact member by which the vehicle 1, when travelling forward, will normally first make contact with a pedestrian upon collision. It will also be seen plainly from FIGS. 1 and 3 that the bar 15, when stowed, lies substantially protected from impact with colliding pedestrians by the adjacent and more forward bumper 13. In its operating position, indicated by reference 15' in FIGS. 1 and 3, bar 15 lies above and forward of the front edge 4 of bonnet surface 3, and will thus constitute a barrier, restraining collision victims who have landed upon the bonnet from falling off again in a forwards direction. Without such a barrier, they would naturally tend to do this when the driver of the vehicle braked in reaction to the accident. In the intermediate position, indicated by reference 15" in FIG. 1, it will be seen that bar 15 lies nearly level with its stowed position and nearly vertically below its operating position, illustrating that the linkage of legs 16 causes bar 15 to travel a roughly right-angled path, when viewed in side elevation, between its stowed and operating positions.

Figure 2:
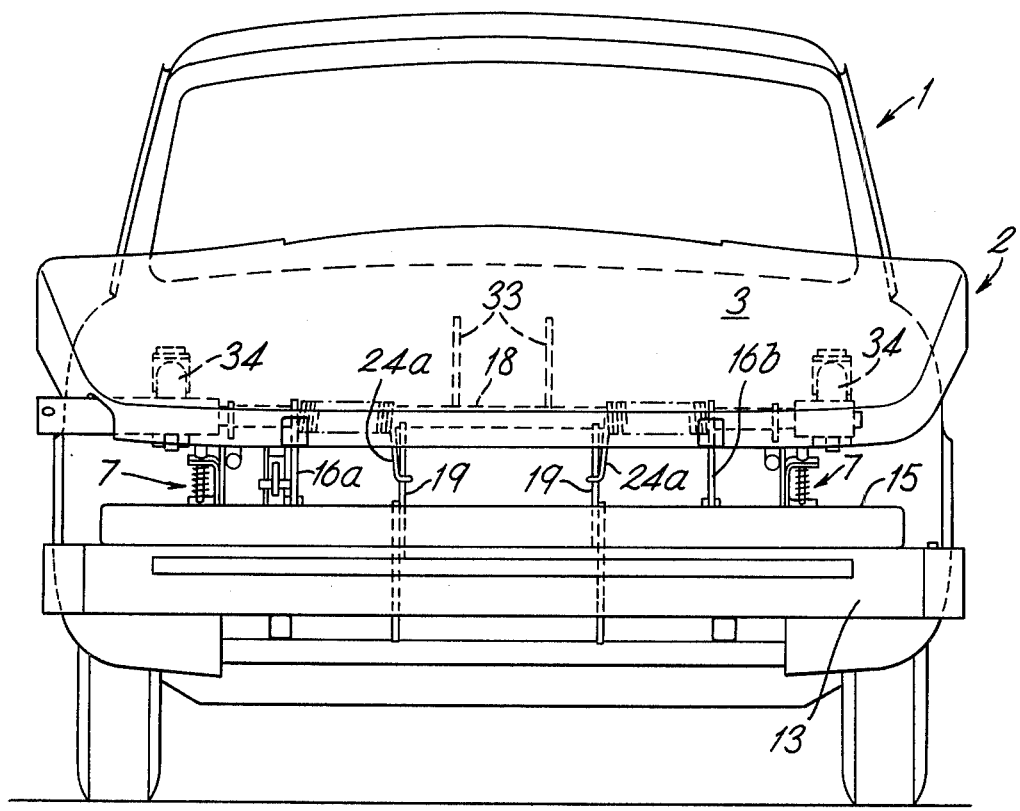
FIG. 2 is a front elevation of the same vehicle.

The legs 16 that carry bar 15 are themselves pinned to a mainshaft 18 lying along axis 17 and rotatably mounted on arms 19 themselves anchored to the vehicle chassis. One of the two leg units 16 (indicated 16a in FIGS. 2 and 3) is shown in detail in FIG. 4 and comprises sections 20 and 21 pivoted together at 22. Section 20 is cranked and carries the bar 15. Section 21 is roughly "U"-shaped, and the end of it remote from pivot point 22 is pinned to mainshaft 18 adjacent a bearing in which the mainshaft passes through a fixed structural member 23. A spring 24, which provides the drive force by which the safety device is moved from its stowed to its operating position, is supported from member 23 and bears against leg section 21 at 25. When the safety device is in its stowed position, a pin 26, carried by leg 16a, is held by a catch 29 pivotally mounted on a pillar 40 which is itself mounted on the vehicle chassis 41. Catch 29 cooperates with a release lever 42, also pivoted on pillar 40. When either of the microswitches 10 or 14 operates in response to the sensing of a collision, solenoid 12 draws in the plunger 28 and thus pulls cable 27 to pivot lever 42 and release the catch 29. Springs 24, 24a now cause pin 26 to fly out of the catch and the leg sections 20, 21 and bar 15 to move to the position in which they are shown in chain-dotted lines in FIG. 4. For the initial phase of movement, the springs 24, 24a cause the bar 15 to run forwards along the top surface of bumper 13, thus causing section 20 to pivot counter-clockwise about pivot point 22 relative to section 21. As the first stage of movement proceeds section 20 over-centers relative to 21, bar 15 runs off the front edge of bumper 13, and when position 15" (FIG. 1) is reached, pawls 31 engage with steps 30 and lock sections 20, 21 so that they no longer pivot about 22. This begins the second stage of movement in which the safety device turns as a whole about axis 17 and bar 15 rises in an arc 32 to position 15'. Here it is held because stop arms 33, pinned to mainshaft 18, have now come up against stops (not shown) carried at the rear of bumper 13. One of arms 33 will also have engaged a ratchet (not shown) to hold the bar positively in its raised position.

Leg 16b (FIG. 2) is similar in all respects to leg 16a of FIG. 4 except that it does not carry a pin 26.

The safety device may be prevented from approaching its operating position too rapidly by a damping means comprising pneumatic cylinders 34 pivotally mounted to the car structure at 35. The plungers 36 of these cylinders are connected to mainshaft 18 by a lost-motion device including lever arms 37, which operate so that the damping is ineffective as the safety device executes the first stage of its movement between stowed and operating positions, i.e. while bar 15 is travelling to position 15" of FIG. 1, and only operates for the second stage during which bar 15 rises by arc 32 to position 15'.

The impact member must lie below the center of gravity of typical pedestrians, that is to say those whose presence upon roads is reasonably to be expected, including not only the normal-sized adult, but also small adults and walking children.

A typical height off the ground for the mid-height of a bumper, as shown in the Figures, and acting as an impact member according to the present invention, may fall within or close to the range 375 – 420 mm; the bar 15 which, when stowed, rests closely above the bumper will typically be 50 mm in diameter. Impact between such a bumper of a moving car and typical pedestrians will tend to sweep them off their feet and pivot them clockwise (as seen in FIG. 1) about a horizontal axis so that their torsos fall onto surface 3. Whether solenoid 12 should then be operated by a bumper-linked sensor (micro-switch 14) and/or a bonnet-linked one (micro-switch 10) will depend upon the precise design of the vehicle. It will also readily be understood that the response of solenoid 12 and the associated release mechanism, and the speed of movement of bar 15 when released, must be such that position 15' is reached before braking of vehicle 1 is likely to throw the pedestrian victim forwards off bonnet 2, but not so rapid that bar 15 rises and strikes the victim before he has landed on the bonnet. Thus, if a bumper-linked sensor is used, there may also be a delay device, of conventional kind, but incorporated in circuit 11, to prevent bar 15 rising too soon after the impact against the bumper. However, should the safety device work quicker than ideally in some accident in which the victim takes longer than usual to reach the bonnet surface 3, the probable impact between the legs of the victim and bar 15 moving horizontally outwards in its first stage of movement may often tend to speed the pivotal movement of the victim and thus assist his trajectory onto the bonnet, rather than impede it.

In the drawings, the bar 15 is shown as being straight from end to end, in contrast to the curve of the bumper and the front edge of the bonnet when seen in plan. In an alternative design, the ends of bar 15 could be curved so that, when the bar is horizontal and stowed, they match the bumper and bonnet curves more nearly. In this case, the mechanism to raise the bar to its operating position may contain a linkage to ensure that the ends still lie horizontal in that position and do not point up or down.

It is also within the scope of this invention that the bar of the safety device, when stowed, could be mounted at the same vertical height as already described but more forwardly so that the bar became in effect the bumper and impact member of the vehicle, and in such a case the micro-switches or other sensor mechanisms could be associated with the safety device itself.

I claim:

1. A vehicle including:
   an impact member located at low height off the ground, and by which the moving vehicle will tend upon collision with a typical pedestrian to make impact below his center of gravity;
   a bonnet onto which said impact by said impact member will tend to throw said pedestrian;
   at least one sensor means connected to said vehicle for sensing and being actuated by one of (1) said initial collision of said impact member with said pedestrian and (2) the subsequent impact of said thrown pedestrian on said bonnet;
   a safety device moveable in a path of movement from a stowed position to an operating position, in which operating position said safety device forms a barrier to restrain said pedestrian from falling off said bonnet;
   said safety device in said stowed position lying at a height off the ground below that of said bonnet and closely similar to that of said impact member;
   said path of movement of said safety device from said stowed to said operating position carrying it first horizontally and outward from said vehicle and then upward; and
   means responsive to the actuation of said at least one sensor means for moving said safety device through said path of movement thereof from said stowed to said operating position.

2. A vehicle according to claim 1, wherein said impact member is a front bumper of said vehicle, and in which said safety device when in said stowed position lies close to said front bumper and is protected from impact with colliding pedestrians by said front bumper.

3. A vehicle according to claim 1 in which said at least one sensor means is associated with said bonnet to sense the fall of said pedestrian thrown thereupon after being collided with by said impact member.

4. A vehicle according to claim 1 in which said safety device comprises a central base length and two legs, said base length being linked at each end to a separate one of said legs, in which said legs are pivotted to the body of said vehicle and in which in said operating position said base length lies horizontal, transverse relative to said vehicle, above and slightly forward of said bonnet.

5. A vehicle according to claim 4 in which said legs of said safety device comprise articulated sections, said sections being folded inter se when said device is in its said stowed position, thus collapsing said device, but unfolding as said device moves to its said operating position, thus extending said device.

6. A vehicle according to claim 1 in which said means for moving said safety device comprise springs and in which said safety device includes means for damping the response of said safety device to said springs at least when said safety device is approaching its said operating position.

7. A vehicle according to claim 1 in which said at least one sensor means is associated with said impact member to sense the collision of said pedestrian therewith.

* * * * *